United States Patent [19]

Henze

[11] 3,890,834
[45] June 24, 1975

[54] FORCE OR TENSION MEASURING MEANS

[75] Inventor: Michael Henze, Vasteras, Sweden

[73] Assignee: Allmanna Svenska Elektriska Aktiebolaget, Vasteras, Sweden

[22] Filed: Apr. 17, 1974

[21] Appl. No.: 461,730

Related U.S. Application Data

[63] Continuation-in-part of Ser. No. 394,773, Sept. 6, 1973, abandoned.

[30] Foreign Application Priority Data

Sept. 11, 1972 Sweden.................... 11654/72

[52] U.S. Cl.................................. 73/144; 73/159
[51] Int. Cl. ............................................ G01l 5/10
[58] Field of Search............................ 73/144, 159

[56] References Cited
UNITED STATES PATENTS

| | | | |
|---|---|---|---|
| 3,324,695 | 6/1967 | Sivilotti............................ | 73/144 X |
| 3,481,194 | 12/1969 | Sivilotti et al...................... | 73/144 |
| 3,557,614 | 1/1971 | Muhlberg............................ | 73/144 |
| 3,650,491 | 3/1972 | Pfeiffer ............................ | 73/144 X |
| 3,688,571 | 9/1972 | Atkins et al. ........................ | 73/144 |

Primary Examiner—Charles A. Ruehl
Attorney, Agent, or Firm—Kenyon and Kenyon Reilly Carr and Chapin

[57] ABSTRACT

An improved method of measuring physical quantities such as pressure, tensile force and so on in a material, such as the striplike material in a rolling mill, using a plurality of measuring devices side-by-side, each covering a zone, which devices provide an electrical output proportional to the pressure (strip stress) thereon, and in doing so assume that the whole of the sensor (zone) is covered by the strip being sensed, in which means are provided to correct the outputs of those sensors on the end which are not completely covered by the strip. Means are provided for determining the percentage of coverage of the sensors on the ends, and for multiplying the output of those sensors by a correction factor in order to obtain a corrected output which accurately reflects the physical quantity being measured.

6 Claims, 5 Drawing Figures

3,890,834

FORCE OR TENSION MEASURING MEANS

RELATED APPLICATIONS

This application is a continuation-in-part of application Ser. No. 394,773 filed Sept. 6, 1973, now abandoned.

BACKGROUND OF THE INVENTION

This invention relates to the measurement of physical magnitude such as pressure, tensile force and so on, in a strip-like material such as that found in rolling mills and more particularly to an apparatus for performing such a measurement, which apparatus includes a plurality of sensing means which sense the pressure at various portions of the strip with means being provided to correct the outputs of those sensors which are not completely covered.

Measuring devices are known in the art which can be used for measuring the distribution of the strip tension over the width of a strip-like material such as the strip-like material which leaves the work rolls in a rolling mill. An arrangement of such devices wherein a plurality of devices are provided on the surface of a billy roll in a rolling mill which devices measure the tension at various points along the strip is disclosed in U.S. Pat. No. 3,481,194, granted Dec. 2, 1969 and assigned to the same assignee as the present invention. In the apparatus described therein, the distribution of the strip tension over the width of the strip is measured by a plurality of sensors on a billy roll which is divided into sections or zones arranged axially side-by-side with each section having at least two pressure sensitive areas arranged opposite each other in at least one axial plane. Each of the areas is provided with at least one pressure sensitive transducer positioned near the vicinity of the surface of the billy roll. The sensor is of the type which provides an electrical output signal which is a function of the force of the strip on the zone where it is located. Means are provided to obtain the output signal from the billy roll and supply it to measuring equipment. The output signal is transmitted through suitable filters and a sensitivity regulator to an indicator which will provide a visual indication of the measured value in the respective zone, i.e., a plurality of measuring devices are provided, one for each zone so that the pressure or tension distribution across the strip may be immediately seen. The measured signal from each transducer (measuring zone) is also transmitted to an average processing unit having an output signal which provides an indication of the average value of the tensile stress. Other systems similar to that of the above referenced patent also exist which are used for measuring a physical magnitude along the width of a strip. Each of these suffers from a common deficiency. This deficiency is that inaccurate readings are obtained at the edges of the strip because of the fact that the strip does not always completely cover the pressure transducers (measuring zones) on the ends. That is to say, that in each transducer, the stress signal equal to F/A where F is the tensile force measured on a strip and A the area of the measuring zone surface, where A equals the measuring zone width times the strip thickness is the quantity which the transducer or zone is designed to measure. Hereafter, when speaking of a transducer or sensor, what is meant is a transducer or sensor covering a single measuring zone. Thus, in a sense, these two expressions convey the same meaning. Each of the measuring transducers is adapted in associated electronic circuits to divide the measured force F by a constant value of A. This constant is the same for those transducers or zones which are fully covered as it is for those which are partially covered. As a result, the outputs for the transducers (zones) on the ends which are not fully covered are incorrect. Although in regard to the output indicators associated with those transducers (zones), this can be taken into account by the operator, the incorrect values are furthermore provided to the average processing unit and will result in the system outputting an average value which is incorrect.

Thus, it can be seen that there is a need for a type of device which will correct for the inaccuracies resulting from such operations.

SUMMARY OF THE INVENTION

The present invention provides a solution to the above noted problems. A minimum permissible strip width is first established, and the transducers (zones) which will be completely covered at this width are treated as in the prior art. That is, they are provided directly to their individual output indicators and to the average processing unit. As to the transducers (zones) which may or may not be partially covered depending on the particular strip width present, means are provided first to determine which of these transducers (zones), are completely covered, and which are only partially covered. Those transducers (zones) which are completely covered are then switched directly to their normal outputs. In addition, means are provided to measure the degree of coverage of the transducers (zones) which are partially covered. The outputs from these partially covered transducers (zones) are provided to a compensation circuit wherein they are multiplied by a correction factor which is obtained from the output of the means determining the percentage of coverage. The corrected output is then provided to the output indicator associated with that transducer and to the average processing unit. In this manner, both individual outputs and average outputs are correct no matter whether or not the individual transducers (zones) are completely or partially covered.

DETAILED DESCRIPTION OF THE PREFERRED EMBODIMENT

Figure 1:
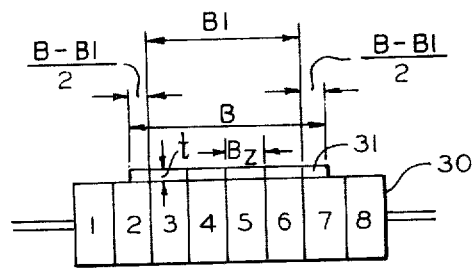
FIG. 1 is a schematic illustration helpful in understanding the relationships between force and area.
Figure 1:
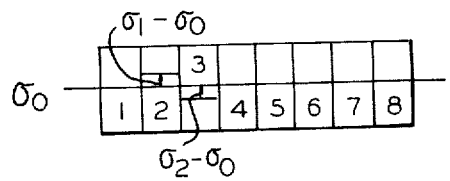

FIG. 1 illustrates the quantities involved in the sensing of pressure by the present invention. As illustrated, a plurality of sensors or transducers each defining a zone numbered 1 through 8 are provided on a special billy roll 30 in accordance with the above referenced patent. The strip 31 being sensed completely covers the zones 3 through 6 but only partially covers the zones 2 and 7. The overall width of the strip is designated B. The width over which the zones are fully covered is designated B1. As shown, the portion of the zones 2 and 7 which are covered will be equal to the quantity (B - B1)/2. As noted above, the stress is equal to F/A where F is a tensile force measured on the strip and A is the area of the measuring surface. The area A of the measuring surface is equal to the width times the strip thickness. For each individual sensor, this area is equal to $B_z$ times $t$ where $B_z$ is the width of an individual zone. As also noted above, the output signal of each of the zones is essentially the measured force divided by a constant value which is proportional to the full width $B_z$ times $t$. This is the correct quantity in regard to the zones 3 through 6. However, as to the zones 2 and 7, the correct quantity to be used in the equation is not $B_z$ but (B - B1)/2. Thus, if no further steps are taken, the outputs of zones 2 and 7 will be incorrect and when averaged with the outputs of zones 3 through 6 will result in an average value which is incorrect.

Figure 2:
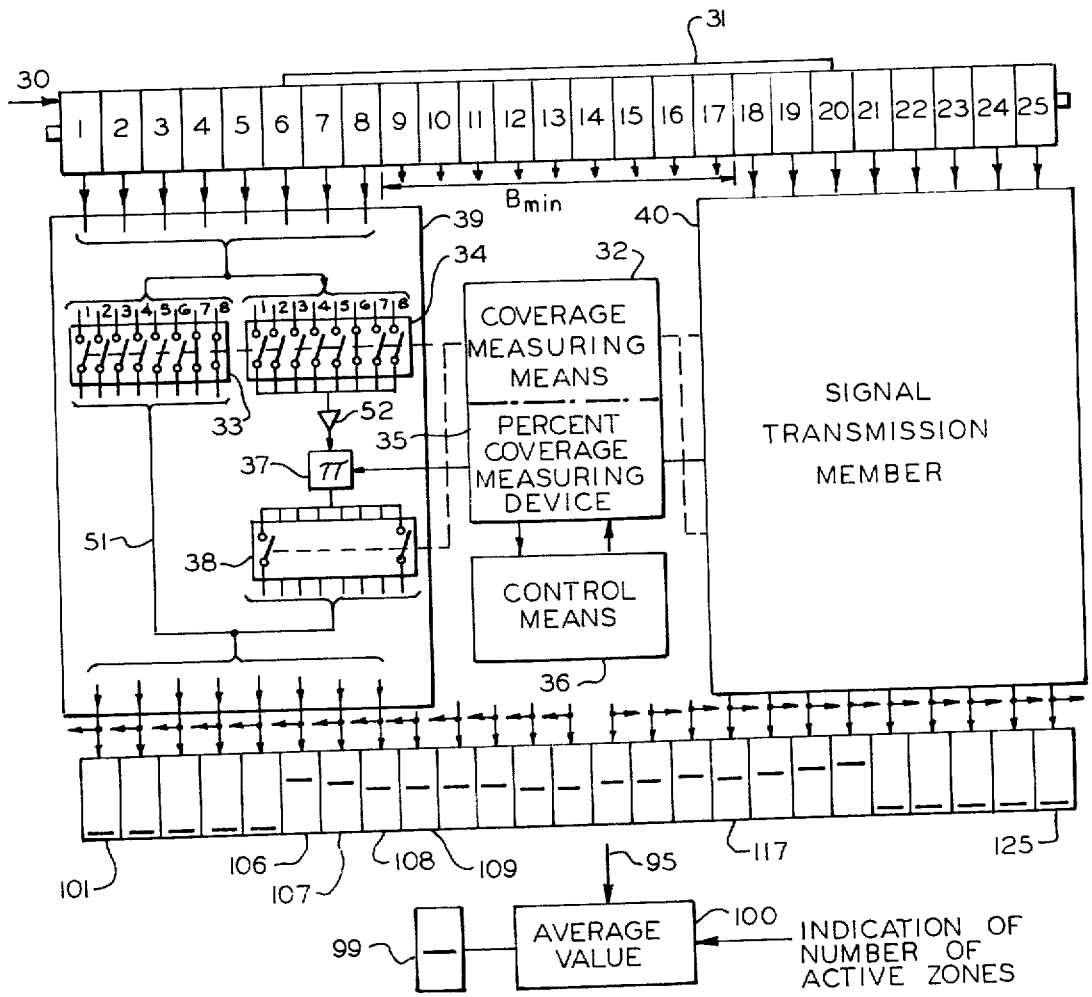
FIG. 2 is a block diagram of the system of the present invention.

FIG. 2 is a block diagram illustrating the overall arrangement of the apparatus of the present invention. Illustrated is a measuring roll 30 which has measuring zones or transducers 1 through 25 arranged axially next to each other along the width of the roll. A strip 31 is passed over the roll 30 and it is the purpose of the sensors thereon to measure the force or tension in each of the designated zones. A minimum width of strip designated $B_{min}$ is predetermined. No strips narrower than $B_{min}$ will be passed over the measuring roller 30. This width covers the zones 9 through 17 and, thus, the outputs of these zones are provided directly to their repective output indicators 109 through 117. In the remainder of description, only the zones 1 through 8 will be discussed in detail. It will be recognized that a similar treatment of the measuring zones 18 through 25 can be accomplished, i.e., the two sides of the roller 30 are normally symmetrical. However, it will be recognized that through the use of special electronic hardware, unsymmetrical correction is also possible.

Measuring means 32 to be more fully described below, are used to determine whether or not each of the zones 1 through 8 and 18 through 25 are completely covered [or at least 90% fully covered]. A switching unit 33 is provided which obtains outputs from the device 32, which outputs act to close the switches associated with the zones which are completely covered. That is, as schematically illustrated, the outputs of each of the zones 1 through 8 are provided to corresponding switches 1 through 8 in the switching device 33. These zone outputs are also provided to the switching device 34 to be described below. In response to outputs from the device 32 indicating that the zones 7 and 8 are fully covered, the corresponding switches 7 and 8 in the switching device 33 are closed. As indicated by the line 51, these outputs are then provided to respective output indicators 107 and 108. The device 32 further provides an output to the switching device 34 to close the switches therein corresponding to zones which are partly covered in a manner to be more fully described below. As indicated, the switch 6 is closed since the zone 6 is partially covered.

A second measuring device 35 also to be described in detail below is used to determine the degree of coverage of the zones which are partially covered. That is, it will provide an output proportional to the percentage of coverage. It obtains inputs from the control means 36 and will be described in detail below. Basically means 36 permits presetting strip width B and zone width $B_z$. The output signal from the transducer 6 is provided through its associated switch in the switching device 34 and through buffer amplifier 52 to a multiplier 37. The second input is multiplier 37 is the output of the measuring device 35 in the form of a correction signal which is proportional to the degree of coverage. The corrected signals so obtained from the multiplier 37 is then switched through a corresponding switch in a third switching device 38, also responsive to the output of device 32, and provided to the output 106. This signal along with the other signals may then also be provided to an average processing unit 100 having an associated indicator 99 in the manner described in the above identified application. In this manner, all the output indications in the individual output indicators 106 through 120 will correctly reflect the amount of pressure being applied to their associated transducers. In addition, a corrected average valve is provided. As indicated, transducer 100 will have an input from block 36 which will indicate the number of zones to be averaged.

As indicated by the horizontal arrows coming off the signal inputs to the individual output indicators 101 through 125, which indicators may be any conventional type of indicator which has a needle position proportional to the input voltage, are provided to the average processing unit 100. These outputs are coupled to the average processing unit 100 through a line 95, only a single line being used on the drawing to represent all twenty five inputs. The average processing unit will also have an input from device 36 which input is indicative of the width of the strip being measured. The average processing unit essentially may comprise a summing amplifier in which all 25 signals are summed and which has a feed back resistor which is varied according to the width B. In this manner, the feed back resistance is used to perform a division by the number of zones from which outputs are obtained.

In general terms, the devices 33, 34, 37, 38 and 52 may be termed a signal transmission member which is designated by the reference numeral 39. Correction of the output from the zone 20 will be accomplished in a similar manner by identical devices contained within the correction or signal transmission member 40.

Figure 3:
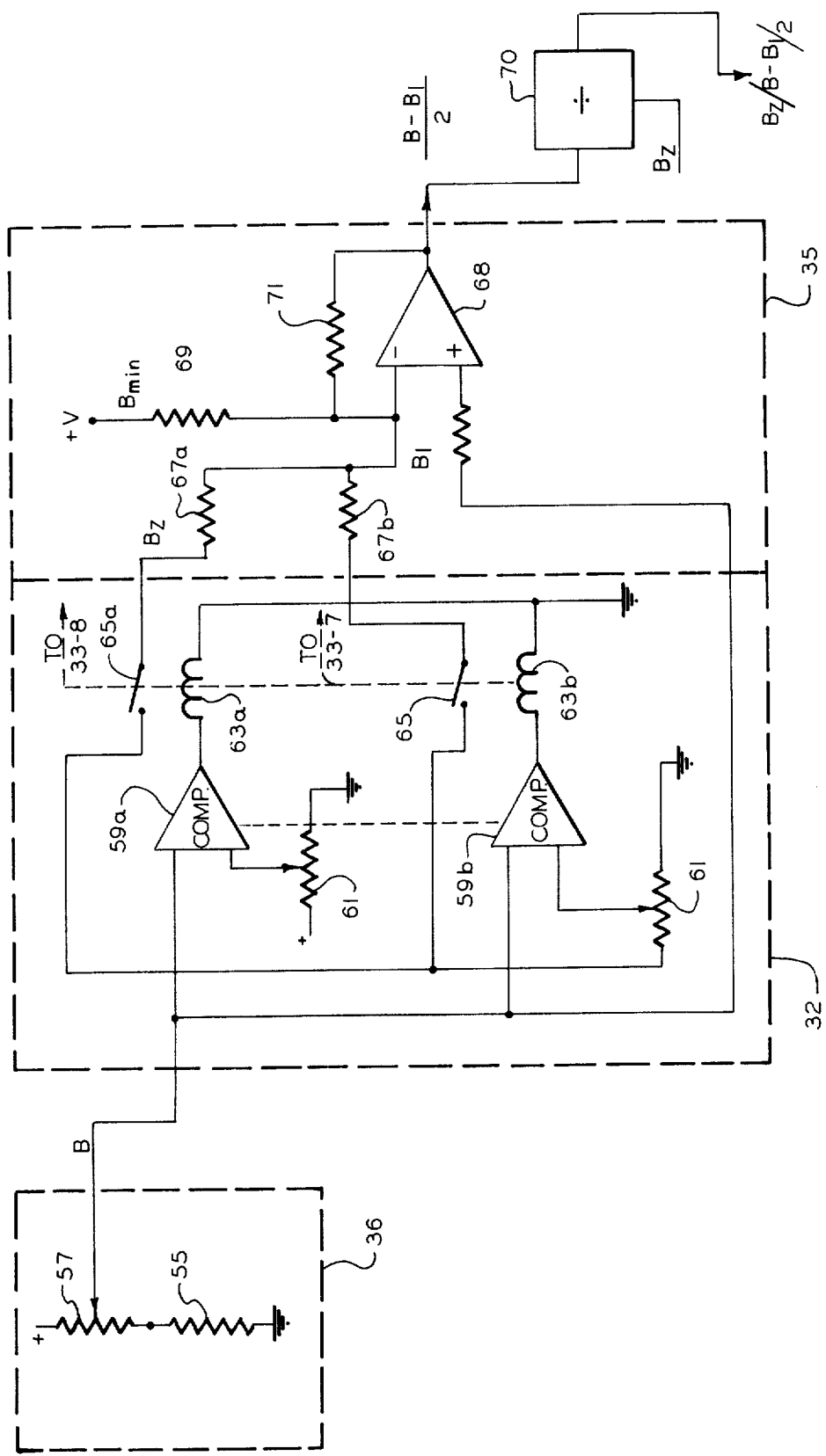
FIG. 3 is a circuit diagram illustrating a portion of the circuitry of FIG. 2.

FIG. 3 illustrates a portion of the circuitry within the measuring devices 32 and 35. From the control member 36 which contains a fixed resistor 55 and a potentiometer 57 coupled in series between a positive voltage and ground, an output is provided which is a value proportional to the width B of the strip. This may be set in using a precision potentiometer which is calibrated according to strip widths using the predetermined known or measured width of the strip passing over the roller 30 of FIG. 2. The fixed resistor 55 represents a voltage value proportional to the quantity $B_{min}$ of FIG. 2. Potentiometer 57 is adjustable over the remaining width range of the roller 30. The output value B is provided as an input to the device 32 which comprises a plurality of comparators 59, one being associated with each of the zones 1 through 8 and 18 through 25. Only the comparators for these zones 1 and 8 are shown with the remaining missing units indicated by the dotted lines. The same is true of the remaining elements associated with each of the comparators. Although in the present example there are eight zones at each end which may or may not be covered, it will be recognized that this number may be increased and decreased. In accordance therewith more or fewer comparators and elements will be provided. Each of the comparators 59 is provided with a reference input potentiometer 61. These reference potentiometers 61 are set in accordance with multiples of the zone width $B_z$ so that the comparator 59a, for example, will have an input reference representing the width when the zone 8 is just covered [or 90% covered]. Thus, if the output value B is greater than this, the comparator 59a will have an output. If the value is less, the comparator 59a will have no output. Similarly, each of the associated comparators will have outputs only if the value B exceeds their preset reference value. Thus, the comparator 59b which is associated with the zone 1 will have an output only if the zone 1 is completely or nearly completely covered. The comparator outputs are used to energize relay coils 63 with the relay associated with comparator 59a designated 63a and that associated with comparator 59b as 63b. Associated with each relay coil 63a and 63b are respective relay contacts 65a and 65b. The switches in the switch block 33 may comprise another set of relay contacts operated by the same relay or may be operated in response to an output from the relay contacts or the comparators. Thus, in response to comparators 59, the associated switches in block 33 will be closed for those zones which are completely covered. Closure of a relay contact 65a will result in a positive voltage being applied through an associated input resistor 67 to a summing amplifier 68. Each input represents an increment $B_z$. A fixed input resistor 69 is provided to represent the quantity $B_{min}$. Thus, when the value representing $B_{min}$ is summed with the number of $B_z$ inputs corresponding to the zones completely covered the resulting value is the quantity B1 of FIG. 1, i.e., the distance across the zones which are completely covered. For the example of the FIG., $B_z$ outputs for zones 7, 8, 18 and 19 would be summed with $B_{min}$. This quantity is provided as the inverting input to amplifier 68 which has as its second input its non-inverting terminal the quantity B. The scaling between the input resistors 67 and 69 and the feedback resistor 71 is such that the output (B - B1) of amplifier 68 is divided by 2.

The output of amplifier 69 is provided to an analog divider 70 having as a second input $B_z$. Therein $B_z$ is divided by (B - B1)/2. This is the second input to multiplier 37 of FIG. 2. The sensor output of a partially covered sensor equals F/t (B - B1/2. Since $F/B_zt \times B_z/(B - B1)/2$ equals F/t (B - B1)/2, the output will be corrected.

Figure 4:
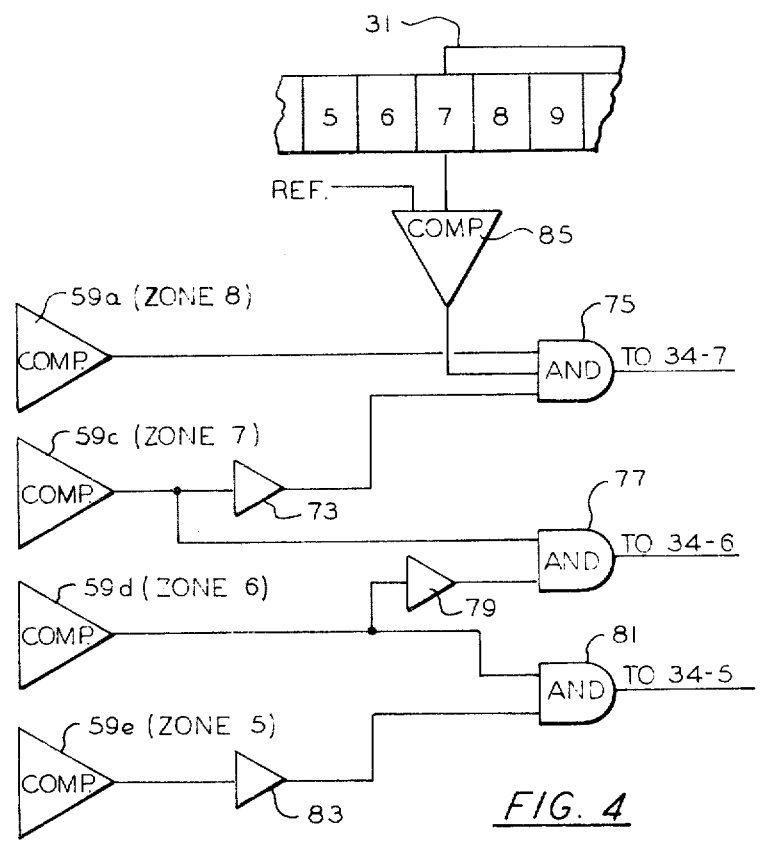
FIG. 4 is a circuit diagram illustrating additional portions of the circuitry used in FIG. 2.

A manner in which the switches in the switching device 34 may be operated is illustrated on FIG. 4. The comparators 59 of FIG. 3 will provide an output only if their corresponding zone is completely covered. The comparator 59a, corresponding to the zone 8, will provide an output when zone 8 is completely covered. Assume that zone 8 is completely covered and zone 7 partially covered. In that case, the next comparator 59c associated with zone 7 will not have an output. In other words, it will have a zero output. This output is provided through an inverter 73 as one input to an AND gate 75 which has its second input the output of comparator 59a. The presence of two inputs at gate 75 indicates the situation where the zone 8 is completely covered but zone 7 is not completely covered. The output from AND gate 75 is then provided to the switch 7 in the switching device 34 of FIG. 2 to close that switch. Similarly, if the comparator 59d is assumed to be associated with the zone 6, an identical arrangement with the switching command for the switch 6 in switching device 34 provided by AND gate 77 which has as its input the output of comparator 59c and the inverted output of comparator 59d through inverter 79 is shown. Similarly, AND gate 81 provides a switching output for the fifth switch in device 34 combining the output of comparator 59d and the output of comparator 59e inverted through inverter 83. In similar fashion, outputs for switching the remainder of the switches in the device 34 may be provided.

With only this arrangement, outputs will be provided when the sheet 31 is right at the edge between the zones 7 and 8. To avoid an output under these conditions, it is possible to provide an additional input to each of the AND gates such as that shown with AND gate 75. An output is taken from the zone sensor of zone 7 for example, to a comparator 85 which has as a reference input a value at or near zero. Thus, comparator 85 will only provide an output if the sensor associated with zone 7 is indicating pressure thereon. With this additional input to AND gate 75, it will not provide a command to close the switch 7 in device 34 unless there is some pressure on its associated sensing device.

Figure 5:
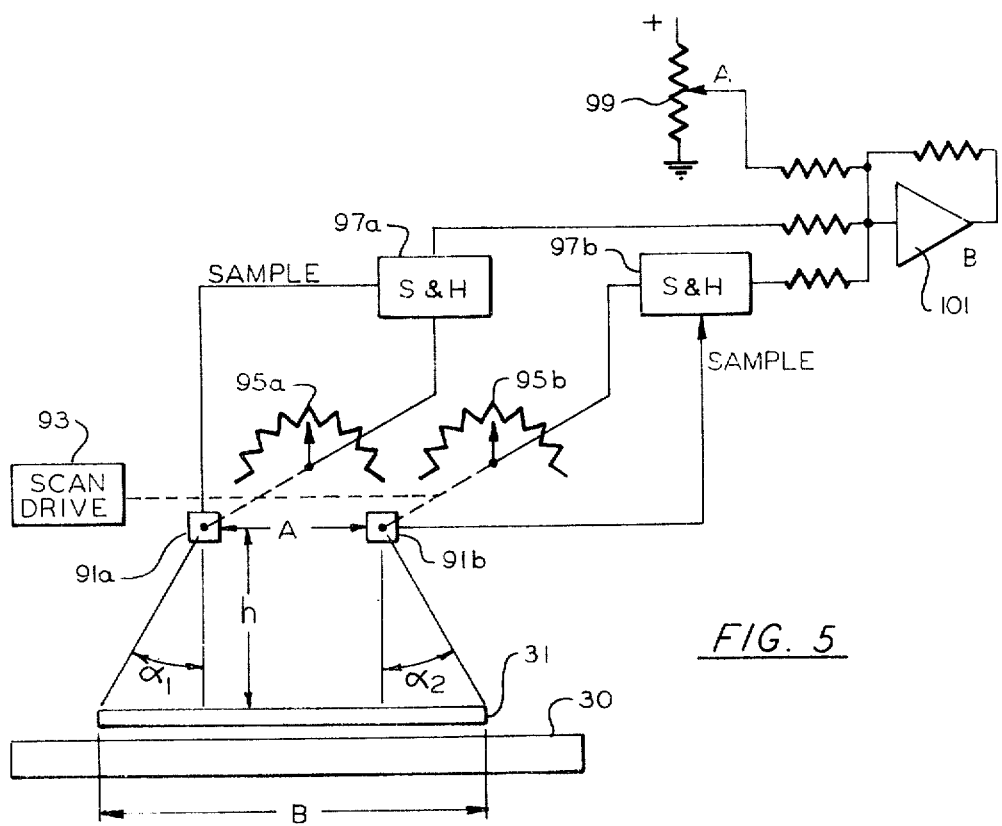
FIG. 5 is a schematic diagram of means for measuring B.

FIG. 5 illustrates an alternate manner of providing the input B to block 32 of FIGS. 2 and 3. As illustrated, two photocells 91a and 91b are caused to scan the surface of the roller 30 scanning outwardly from the vertical toward the edges of the roller. A suitable light source is provided either along with the photo sensor or separately. Scanning is done with conventional scan drive means 93. The two scanners are separated by a distance A so that the total width B of the strip will be equal to $A + h$ tangent $\alpha 1 + h$ tangent $\alpha 2$ where $h$ is the distance of the photo sensors above the strip. Quantities proportional to $h$ tangent $\alpha 1$ and $h$ tangent $\alpha 2$ are obtained from tangent wound potentiometers 95a and 95b coupled to the scanning sensors. The potentiometer outputs are provided respectively to sample and hold circuits 97a and 97b as the data input thereto. Sample inputs to the respective sample and hold circuits 97a and 97b are obtained from the photosensors 91a and 91b respectively. That is, these photosensors will be outputting a signal at one level when light is reflected off the strip 31 and at another level when the edge of the strip 31 is passed. At the transition, the edge of a pulse will be generated which edge is then used as a sample input to the sample input and hold circuit causing them to sample the values thus being output by potentiometers 95a and 95b, which values will represent the width increment which must be added to the fixed width A in order to obtain the overall width B of the strip. The outputs of the sample and hold circuits 97a and 97b are then added with a predetermined fixed value representing the distance A, and obtained from a potentiometer 99, in a summing amplifier 101 with appropriate input and feed back resistors. Thus, the output of amplifier 101 will be a quantity proportional to the width B and may be used in the measuring device 32 of FIGS. 2 and 3.

Thus, a system has been shown which makes it possible to obtain proper indications of the strip tension in the edge zones of a multizone tension measuring arrangement, which indications are independent of the degree of coverage of the individual zone, thereby permitting not only accurate zone measurements to be made but more accurate average values to be obtained.

Although a specific embodiment has been illustrated and described, it will be obvious to those skilled in the art that various modifications may be made without departing from the spirit of the invention which is intended to be limited solely by the appended claims.

What is claimed is:

1. In an arrangement wherein a plurality of measuring devices are arranged side-by-side for measuring the pressure of a strip placed on top thereof at each a plurality of zones, with the outputs of the measuring devices provided to indicating means, apparatus to correct for errors caused by the measuring devices on the ends not being completely covered by the strip comprising:
   a. means for coupling the measuring devices of the completely covered zones to the indicating means;
   b. means having the outputs of said partially covered devices as inputs, said means adapted to correct said inputs and provide corrected outputs; and
   c. means providing said corrected outputs to said indicating means.

2. The arrangement of claim 1 wherein said means for coupling include means for determining which zones are completely covered and means responsive thereto switch the outputs of the measuring devices associated with said completely covered zones to said indicating means.

3. The arrangement of claim 1 wherein said means for correcting include means for determining the degree of coverage of said partially covered zones and means for developing a correction signal therefrom.

4. The arrangement of claim 1 wherein the apparatus of claim 1 is divided into two signal transmission members each including means for coupling, means for correcting and means for providing, one of the members being associated with the zones on the right and the other with the zones on the left of the arrangement.

5. In an arrangement wherein a plurality of measuring devices are arranged side-by-side for measuring the pressure of a strip placed on top thereof at each a plurality of zones, with the outputs of the measuring devices provided to indicating means, apparatus to correct for errors caused by the zones on the ends not being completely covered by the strip comprising:
   a. means for determining which zones are completely covered;
   b. means for coupling measuring devices of the completely covered zones to the indicating means;
   c. means for finding the portion of covering of the partially covered zones and for developing a correction signal therefrom;
   d. means for multiplying the outputs of the devices associated with partially covered zones by said correction signal to obtain corrected outputs; and
   e. means providing said corrected outputs to said indicating means.

6. In an arrangement wherein a plurality of measuring devices are arranged side-by-side for measuring the pressure of a strip placed on top thereof at each a plurality of zones, with the outputs of the measuring devices provided to indicating means, apparatus to correct for errors caused by the zones on the ends not being completely covered by the strip comprising:
   a. a first set of switches associated with respective measuring devices for selectively coupling the measuring devices to the indicating means;
   b. means for determining which zones are completely covered and providing outputs to close the respective ones of said first set of switches associated with the measuring devices for those zones;
   c. means for finding the portion of covering of the zones on the ends and to develop a correction signal therefrom;
   d. means for correcting the output of the measuring devices associated with said end zones which are partially covered using said correction signal;
   e. a second set of switches similarly associated with said measuring devices for selectively coupling the measured devices associated with said end zones to said means for correction;
   f. means to determine which zones are partially covered and to close the ones of said second set of switches associated with the measuring devices for these zones; and
   g. a third set of switches responsive to said means to determine to couple the output of said correcting means to the inputs of said indicating means associated with the partially covered zones.

* * * * *